(12) United States Patent
Ha et al.

(10) Patent No.: US 8,533,631 B2
(45) Date of Patent: Sep. 10, 2013

(54) IMAGE FORMING APPARATUS AND MENU SELECT AND DISPLAY METHOD THEREOF

(75) Inventors: Kwang-soo Ha, Seoul (KR); Sung-jae Chung, Seoul (KR); Bong-gun Kim, Yongin-si (KR); Sang-su Lee, Seoul (KR); Sung-man Shin, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/788,841

(22) Filed: May 27, 2010

(65) Prior Publication Data
US 2011/0107267 A1 May 5, 2011

(30) Foreign Application Priority Data
Oct. 30, 2009 (KR) .................. 10-2009-0104590

(51) Int. Cl.
*G06F 3/048* (2006.01)
(52) U.S. Cl.
USPC ............................ 715/841; 715/828; 715/829
(58) Field of Classification Search
USPC .......................................... 715/841, 828, 829
See application file for complete search history.

(56) References Cited

U.S. PATENT DOCUMENTS

| | | | |
|---|---|---|---|
| 6,278,443 B1 * | 8/2001 | Amro et al. .................... | 345/173 |
| 6,958,749 B1 * | 10/2005 | Matsushita et al. ............ | 345/175 |
| 7,158,123 B2 * | 1/2007 | Myers et al. ................... | 345/173 |
| 7,265,863 B2 * | 9/2007 | Ookuma ........................ | 358/1.15 |
| 7,479,949 B2 * | 1/2009 | Jobs et al. ...................... | 345/173 |
| 7,870,508 B1 * | 1/2011 | Wright et al. .................. | 715/853 |
| 7,913,174 B2 * | 3/2011 | Kim .............................. | 715/746 |
| 2006/0294472 A1 * | 12/2006 | Cheng et al. .................. | 715/771 |
| 2007/0130532 A1 * | 6/2007 | Fuller et al. ................... | 715/764 |
| 2011/0062143 A1 * | 3/2011 | Satanek ......................... | 219/489 |
| 2011/0236872 A1 * | 9/2011 | Taylor ........................... | 434/350 |

* cited by examiner

*Primary Examiner* — David Phantana Angkool
(74) *Attorney, Agent, or Firm* — Staas & Halsey LLP

(57) ABSTRACT

Disclosed are an image forming apparatus and a menu select and display method thereof. A select and display method of a menu which is displayed on a (touch) screen of an image forming apparatus, the method includes: displaying an initial screen including at least one menu list to perform at least one of functions of the image forming apparatus; selecting one of the displayed menu lists by touch; and displaying in the selected menu area a first subordinate menu corresponding to the menu area to set an option for the selected menu without converting the remaining menus. With this, an image forming apparatus and a menu select and display method thereof selectively converts a selected menu area only and displays a subordinate menu to set an option for the menu to thereby reduce a load arising from the conversion and returning of the overall screen and reduces user's inconvenience.

23 Claims, 20 Drawing Sheets

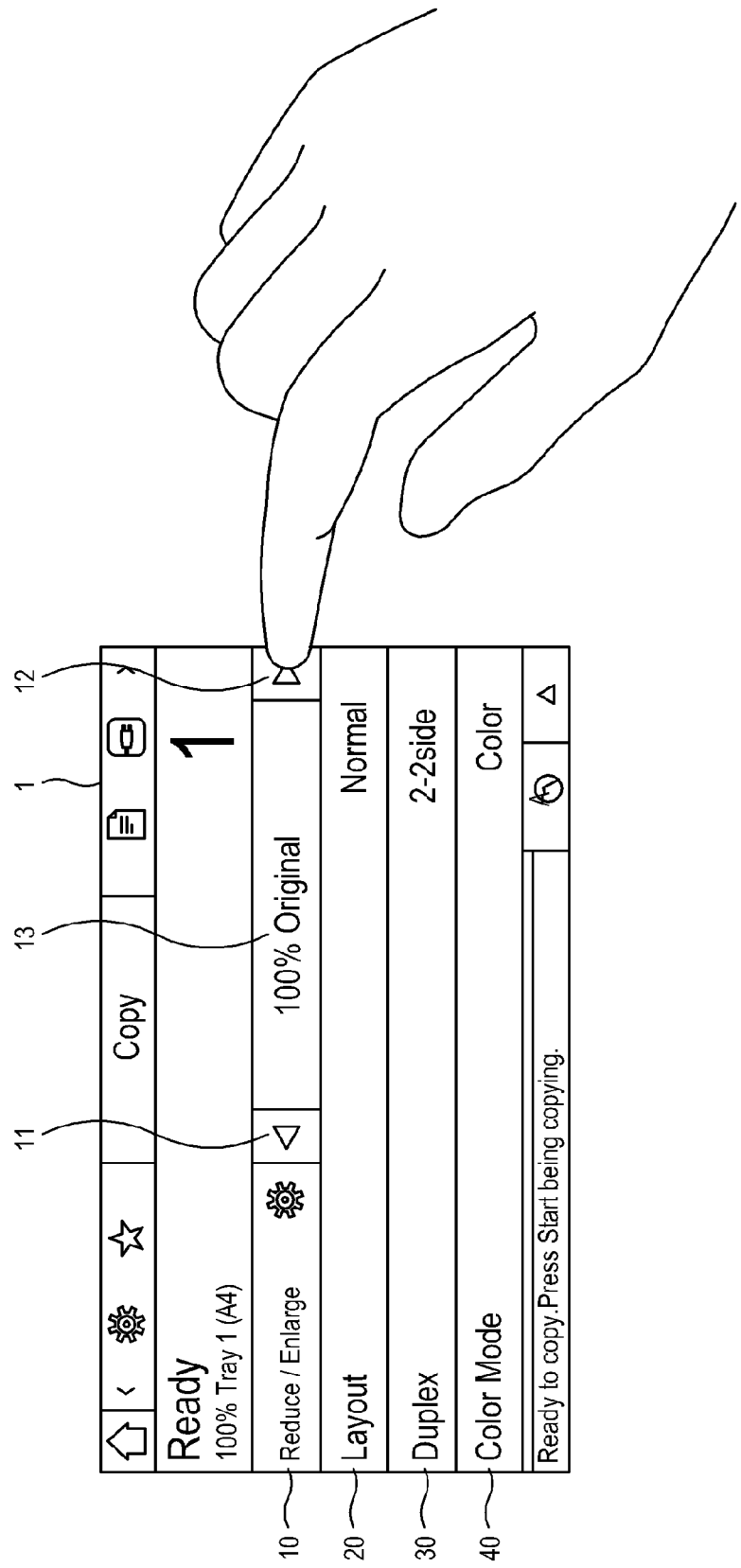

IMAGE FORMING APPARATUS AND MENU SELECT AND DISPLAY METHOD THEREOF

CROSS-REFERENCE TO RELATED APPLICATIONS

This application claims priority from Korean Patent Application No. 10-2009-0104590, filed on Oct. 30, 2009, in the Korean Intellectual Property Office, the disclosure of which is incorporated herein by reference.

BACKGROUND

1. Field

Apparatuses and methods consistent with the present invention relate to an image forming apparatus and a menu select and display method thereof, and more particularly, to an image forming apparatus and a menu select and display method thereof which converts and displays a selected menu (area) of a touch screen of the image forming apparatus.

2. Description of the Related Art

An image forming apparatus forms an image on a print medium such as a document. The image forming apparatus may include a printer, a photocopier, a facsimile, a multi-function device which has at least two functions of the printer, the photocopier and the facsimile, etc.

The image forming apparatus includes a user input unit to receive data or various commands from a user. The user input unit may include an input button (hard key) to represent functions of the image forming apparatus or numbers, or a touch screen (touch pad) displayed on a display unit such as liquid crystal display (LCD) to receive a user's input by touch.

A user selects a desired menu and inputs data or a command through the input button or the touch screen.

Generally, the image forming apparatus which supports a touch screen converts a menu screen into another menu screen and displays an option setting screen for a selected menu if a user selects the menu to set the option by touch.

A user sets the option for the selected menu on a converted screen and performs a print operation.

However, a user should convert the screen for each menu to set options for a plurality of menus.

Particularly, extended functions of the image forming apparatus require a user to set options for more menus, causing inconvenience.

Further, a user should return to an initial screen after completion of setting the options to confirm the result of the setting for the plurality of menus

SUMMARY

Accordingly, it is an aspect of the present invention to provide an image forming apparatus and a menu select and display method thereof which selectively converts a menu (area) selected by a user and displays a subordinate menu (or a submenu) to set an option to thereby reduce a user's inconvenience arising from conversion and returning of an overall screen.

Also, it is another aspect of the present invention to provide an image forming apparatus and a menu select and display method thereof which minimizes unnecessary conversion of a screen and a converted area of the screen to reduce a user's burden on manipulation of the image forming apparatus and enables a user to focus on his/her work and maintain work efficiency.

Additional aspects and/or advantages of the present invention will be set forth in part in the description which follows and, in part, will be obvious from the description, or may be learned by practice of the present invention.

The foregoing and/or other aspects of the present invention are also achieved by providing a select and display method of a menu which is displayed on a touch screen of an image forming apparatus, the method including: displaying an initial screen including at least one menu list to perform at least one of functions of the image forming apparatus; selecting one of the displayed menu lists; and displaying in the selected menu area a first subordinate menu corresponding to the menu area through a preset screen transition process to set an option for the selected menu without converting the remaining menus (unselected menus).

The displaying the first subordinate menu may include separately displaying the menu area depending on an application of the screen transition process.

The displaying the first subordinate menu may include returning to an initial menu screen from the displayed first subordinate menu or displaying a second subordinate menu and a first subordinate menu to set an option of another selected menu if the another menu is selected while the first subordinate menu is displayed for the selected menu.

The subordinate menu to set an option may include at least one of a spinner control, an on/off button and a level control for the selected menu.

The method may further include setting an option for the selected menu through the subordinate menu.

The method may further include returning to an initial menu screen if the option setting is completed.

The returning to the initial menu screen may include returning to the initial menu screen displaying the set option in the menu area.

The option and the menu area displayed on the initial menu screen may be reduced or enlarged corresponding to a size of the initial menu screen.

The method may further include converting and displaying at least one of a color and size of the subordinate menu to set an option of the selected menu if the option setting is completed.

Another aspect of the present invention is achieved by providing an image forming apparatus, including: a display unit which displays thereon an initial menu screen including at least one menu list to perform at least one of functions of the image forming apparatus; a user input unit which includes a touch screen displayed on the display unit; and a controller which controls the display unit to display thereon a first subordinate menu in the menu area through a preset screen transition process without converting remaining menus if one of the displayed menus to the first subordinate menu is selected by a user's touch of the user input unit.

The display unit may display thereon the menu area separately depending on an application of the screen transition process.

The display unit may display the selected menu which returns to the initial menu screen or displays a second subordinate menu and the first subordinate menu in the menu areas if another menu is selected through the user input unit while the first menu is displayed in the selected menu area.

The subordinate menu to set an option for the menu may include at least one of a spinner control, an on/off button and a level control for the selected menu.

The user input unit may be used to set an option for the selected menu through the subordinate menu.

The display unit may display the selected menu area which returns to the initial menu screen if the option setting is completed.

The set option may be included in the menu area and displayed on the initial menu screen.

The option and the menu area displayed on the initial menu screen may be reduced or enlarged corresponding to the size of the initial menu screen.

The display unit may convert and display at least one of a color and a size of the subordinate menu to set an option for the selected menu if the option setting is completed.

BRIEF DESCRIPTION OF THE DRAWINGS

The above and/or other aspects of the present invention will become apparent and more readily appreciated from the following description of the embodiments, taken in conjunction with the accompanying drawings of which:

FIGS. 5 and 6 illustrate an example of a touch screen which is converted according to a rotation in FIGS. 4A to 4C;

DETAILED DESCRIPTION

Hereinafter, exemplary embodiments of the present invention will be described with reference to accompanying drawings, wherein like numerals refer to like elements and repetitive descriptions will be avoided as necessary.

Figure 1:
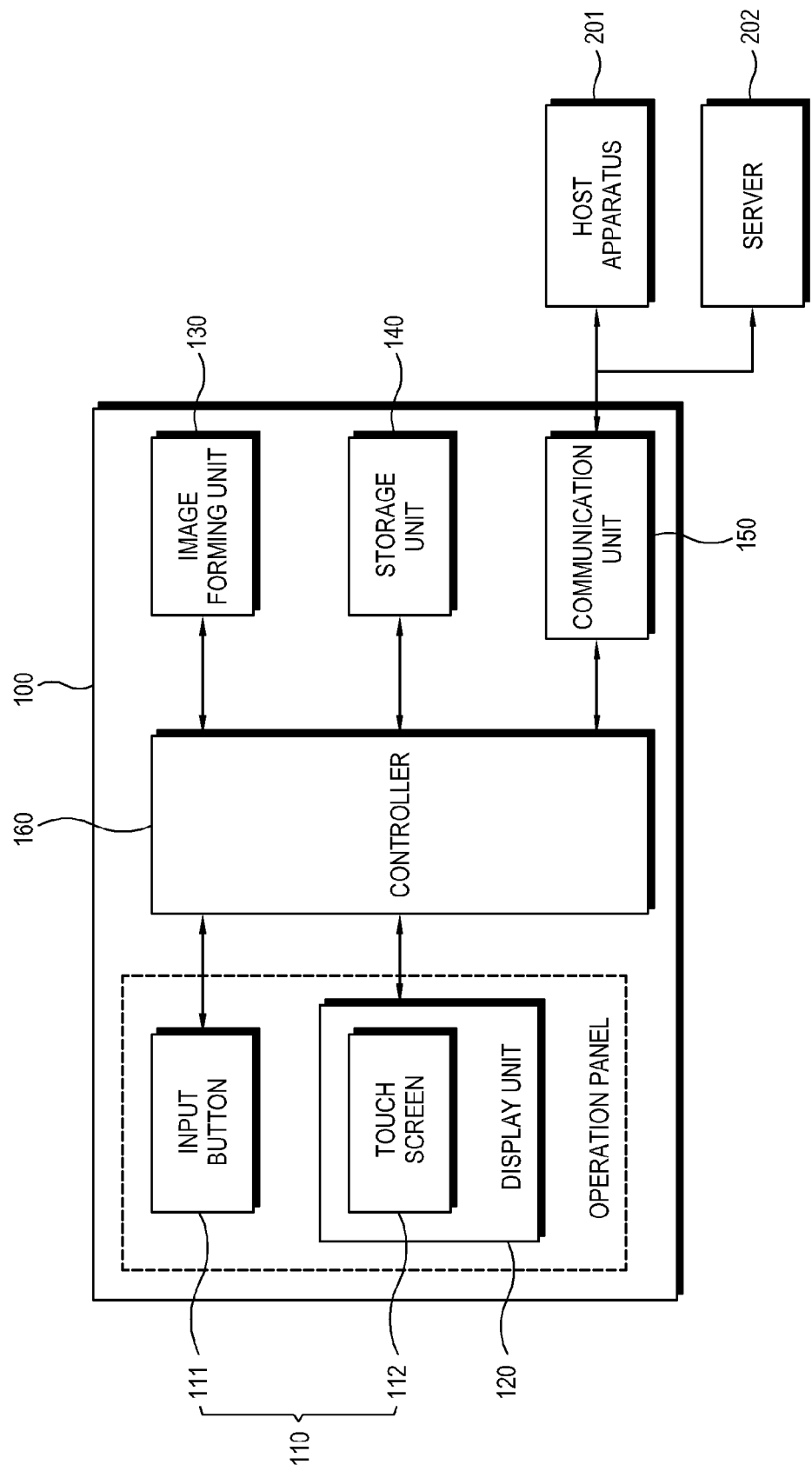
FIG. 1 is a block diagram of an image forming apparatus according to an exemplary embodiment of the present invention.

FIG. 1 is a block diagram of an image forming apparatus 100 according to an exemplary embodiment of the present invention. The image forming apparatus 100 according to the present invention may include a printer, a photocopier, a scanner, a facsimile, or a multi-function device which has at least two functions of the printer, the photocopier, the scanner and the facsimile.

As shown therein, the image forming apparatus 100 according to the exemplary embodiment of the present invention includes a user input unit 110, a display unit 120, an image forming unit 130, a storage unit 140, a communication unit 150 and a controller 160.

The user input unit 110 receives data and/or a command from a user.

The user input unit 110 includes an input button 111 (hereinafter, to be also called hard key or key pad) which is provided in the image forming apparatus 100, and a touch screen 112 (hereinafter, to be also called touch panel or touch pad) which receives a command by user's touch.

The touch screen 112 may include a graphic user interface (hereinafter, to be also called UI) which is generated by an execution of a predetermined application and displayed on the display unit 120 to receive a user's input by touch. However, it is not limited thereto.

The GUI according to an aspect of the present invention may include a menu list which is displayed on an initial menu screen (hereinafter, to be also called standby screen or background screen) of the image forming apparatus 100 to execute a function of the image forming apparatus 100.

The image forming apparatus 100 according to an aspect of the present invention may further include an electronic pen (or digital pen) additionally provided for a user's input by handwriting and an optical character reader (OCR) as the user input unit 100 which recognizes characters by the electronic pen.

A user performs a log-in process through the user input unit 110 to input identification (ID) and password assigned for each user account. The log-in includes an administrator log-in which allows setting and change of all the environments of the image forming apparatus 100 without an additional access limit.

The image forming apparatus 100 identifies and permits a user's log-in or administrator log-in. A user according to an aspect of the present invention includes an administrator.

The display unit 120 displays thereon a setting and operation status of the image forming apparatus 100 and may display a UI screen to receive various commands from a user. The display unit 120 may include a thin film transistor-liquid crystal display (TFT-LCD) and a driver (not shown) to drive the TFT-LCD.

The user input unit 110 of the image forming apparatus 100 according to an aspect of the present invention may be provided as an icon on the display unit 120 to be selected by a user through the touch screen. Thus, the user input unit 110 and the display unit 120 may be provided as a single configuration instead of separate configurations.

The single configuration of the user input unit 110 and the display unit 120 of the image forming apparatus 100 according to an aspect of the present invention is called an operation panel (OPE).

The display unit 120 displays thereon at least one menu list as a touch screen to execute a predetermined function of the image forming apparatus 100.

Figure 2:
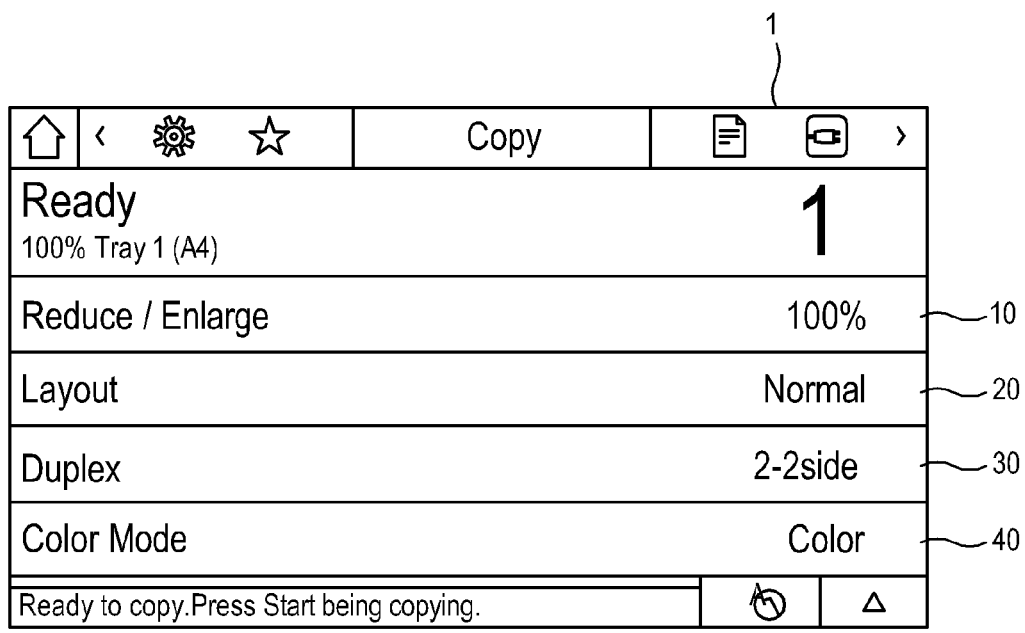
FIGS. 2 and 3 illustrate a touch screen according to the exemplary embodiment of the present invention.
Figure 3:
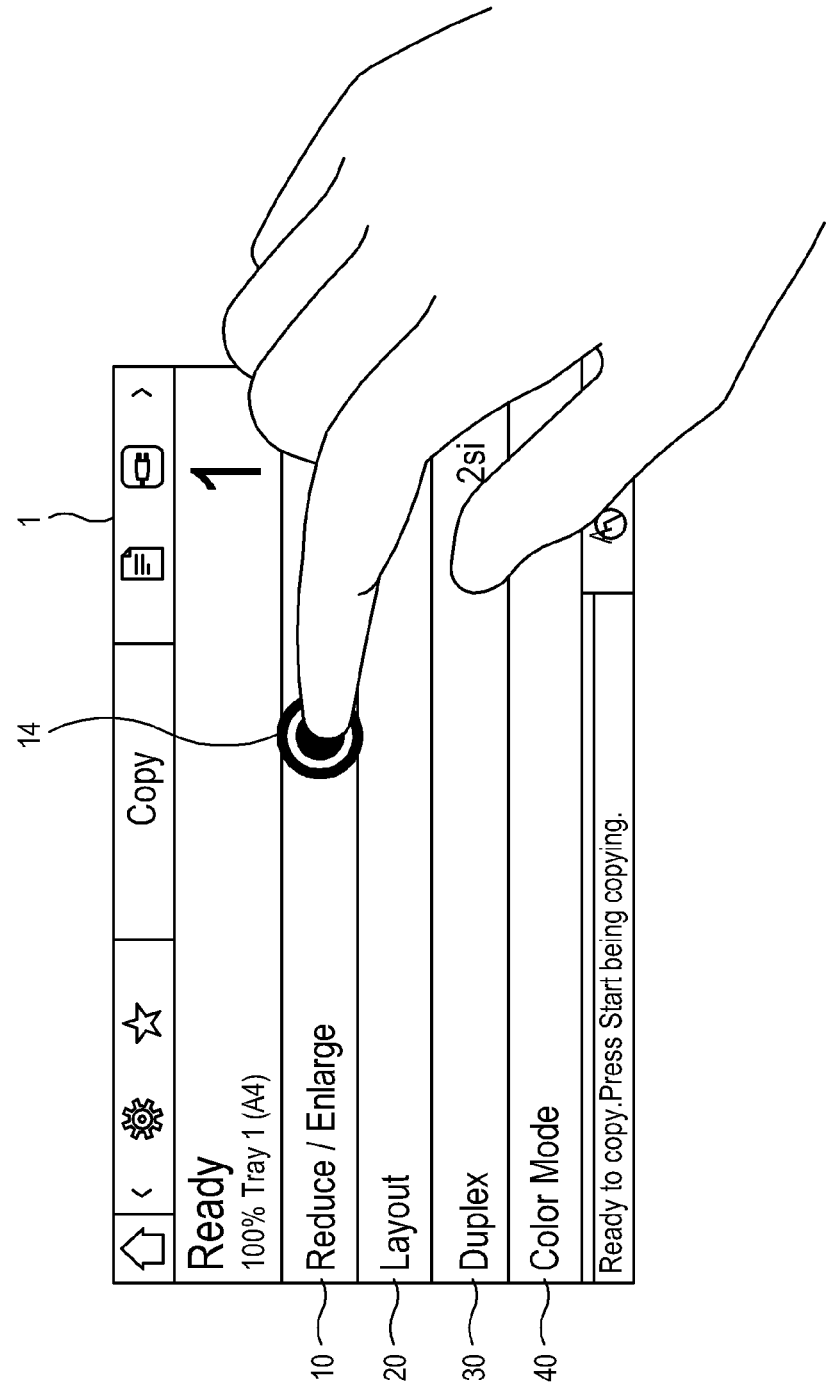

FIGS. 2 and 3 illustrate a touch screen 1 according to the exemplary embodiment of the present invention.

As shown therein, the touch screen 1 displays thereon at least one of menu lists 10, 20, 30 and 40 to perform a predetermined function of the image forming apparatus 100. The at least one of the menus 10, 20, 30 and 40 may include reduce/enlarge 10, set layout 20, duplex 30 and color mode 40. At least one of menus 50, 60, 70 and 80 (refer to FIG. 16) may further include adjust background 50, margin shift 60, edge erase 70 and gray enhance 80.

The at least one of the menus 10, 20, 30 and 40 may additionally include an option set for each of the menus 10, 20, 30 and 40.

A user may touch a predetermined area 14 of the menu 10 out of the displayed menus 10, 20, 30 and 40 as in FIG. 3.

Upon reception of a user's selection by touch with respect to the menu 10 as in FIG. 3, the display unit 120 may convert and display the touch screen 1 to have the selected menu area include a subordinate menu to set an option of the menu 10. The display unit 120 may convert and display the selected menu area 10 through a screen transition process only to include the subordinate menu of the selected menu without converting the remaining menus 20, 30 and 40.

Figure 4A:
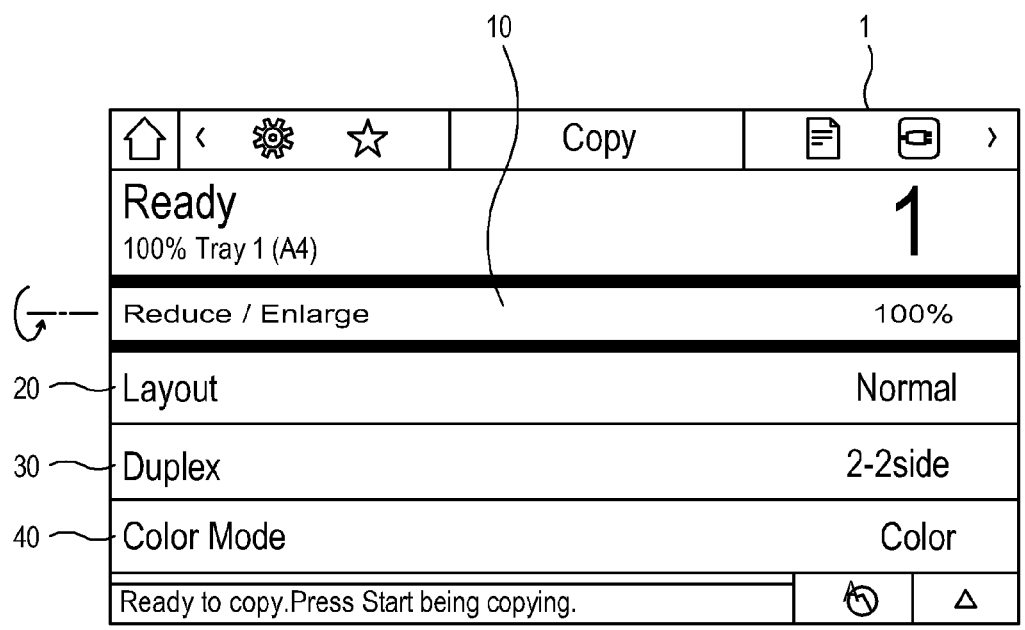
FIGS. 4A to 4C illustrate an example of converting a menu area of the touch screen according to the exemplary embodiment of the present invention.
Figure 4B:
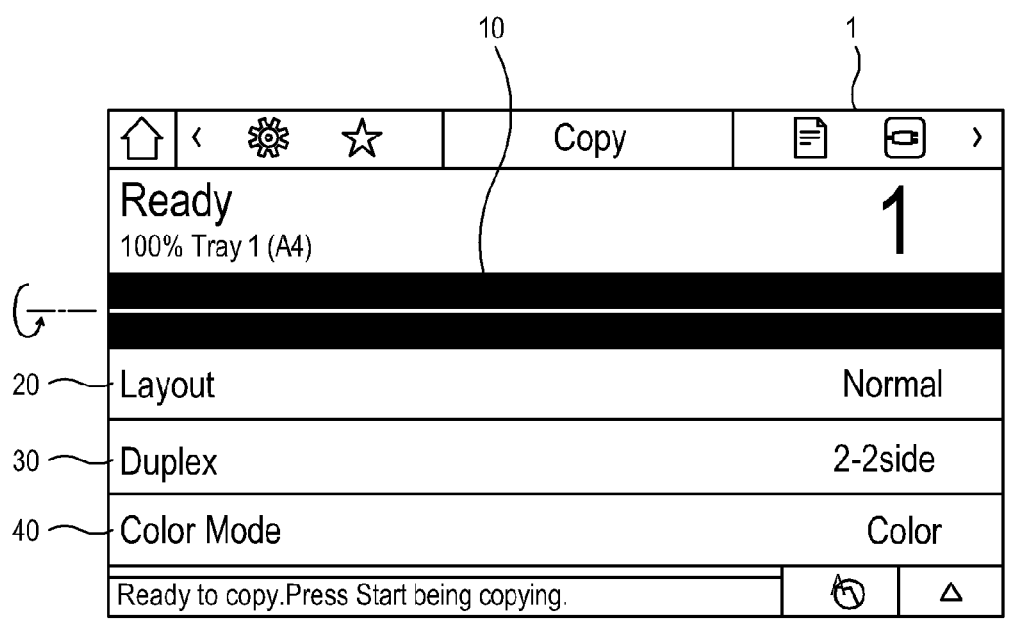
Figure 4C:
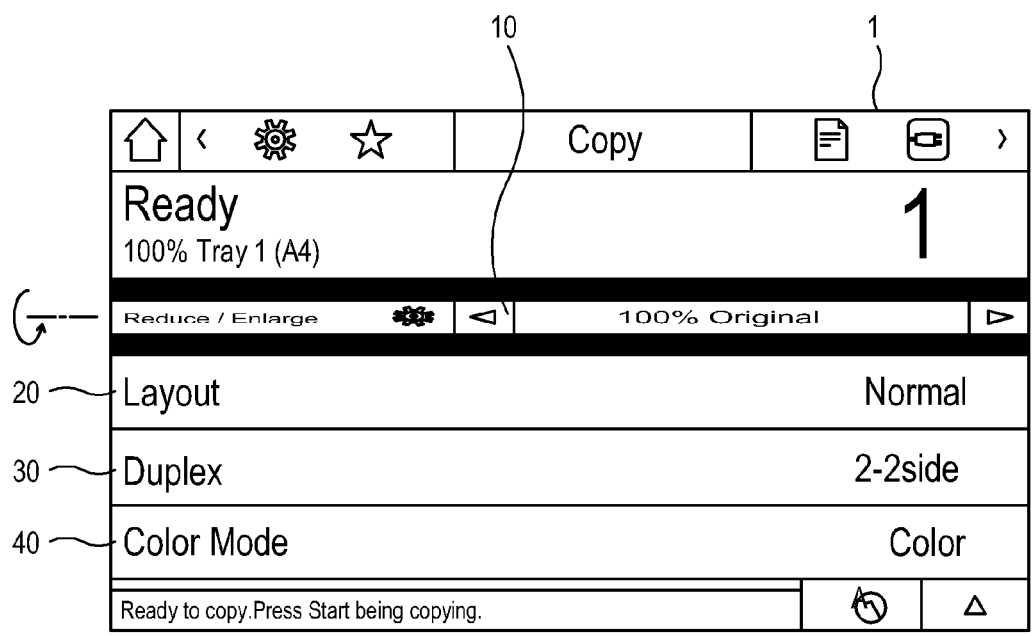

FIGS. 4A to 4C illustrate an example of converting the menu area of the touch screen 1 according to the exemplary embodiment of the present invention.

As shown therein, the display unit 120 rotates a menu area selected by a user's touch in a predetermined direction and displays a subordinate menu of the selected menu to set an option.

FIGS. 4A to 4C illustrate a screen area which rotates up and down, but the rotation direction is not limited thereto. Alternatively, the rotation may be performed left and right, or in a slant right, etc.

The screen transition process according to the present invention (hereinafter, to be also called flip-flop) is not limited to the rotation in FIGS. 4A to 4C, and may be realized by various animation effects with texts or graphic.

For example, the screen transition process may include up, down, rotate, unfold, spatter, lighten, darken and slant line which are transition or animation effects to be applicable to programs like Power Point. The screen transition process may be displayed in a combination as well as a single process.

The screen transition process according to the present invention may be prestored in the storage unit 140. A user may preset one of the plurality of screen transition processes to be applicable corresponding to the menu selected from the initial screen. The screen transition process may be set as a default and stored in the storage unit 140 when the image processing apparatus 100 is released in the market. However, the user also may edit one of the plurality of the screen transition processes.

Figure 6:
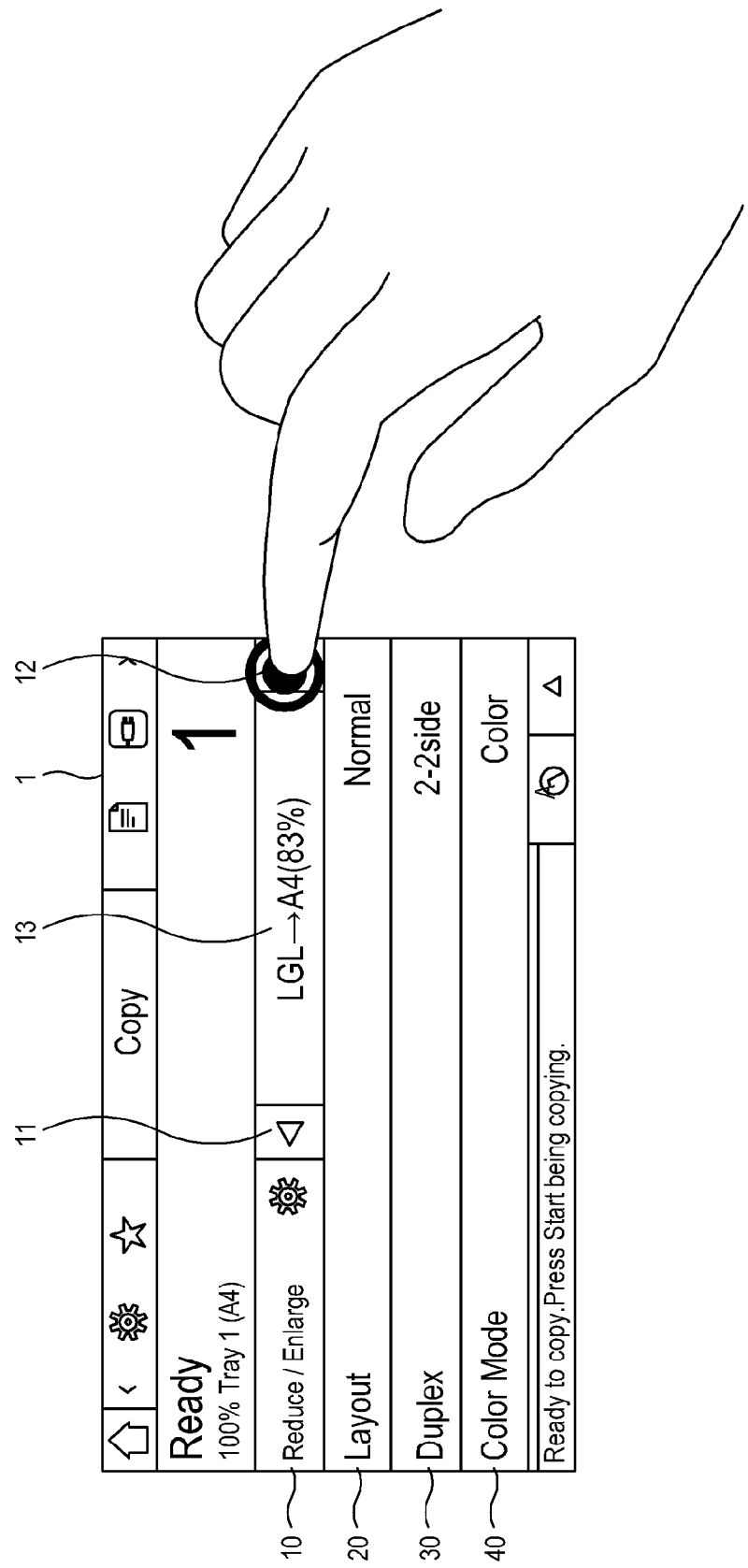

FIGS. 5 and 6 illustrate an example of the touch screen 1 which is converted by the rotation in FIGS. 4A to 4C.

As shown in FIG. 5, the display unit 120 converts and displays a menu 10 which is selected by a user's touch among the plurality of menus 10, 20, 30 and 40 to have the menu 10 include a subordinate menu to set an option.

The subordinate menu of the touch screen 1 as in FIG. 5 may include a spinner control which sequentially displays an option item for the selected menu 10.

More specifically, the spinner control includes a plurality of navigation buttons 11 and/or 12 to receive a user's touch to sequentially select the option item for the selected menu 10 and an option area 13 to display the option item selected by a user.

A user may touch one of the navigation buttons 11 and 12 of the spinner control as in FIGS. 5 and 6, confirm an available option for the selected menu 10 and set an option.

Figure 7:
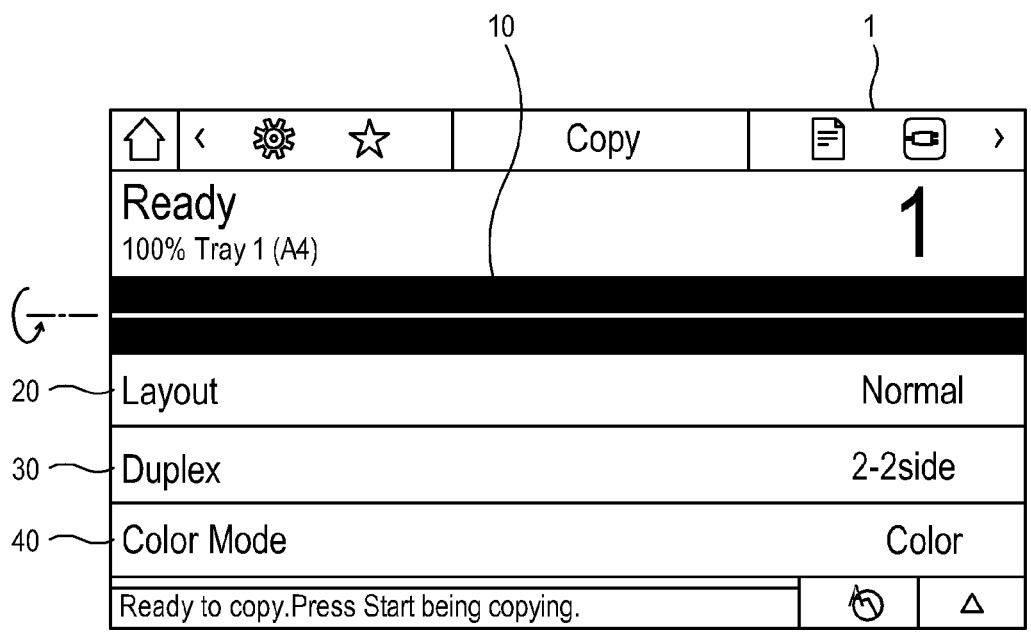
FIGS. 7 and 8 illustrate an example of the menu area of the touch screen returning to an initial screen according to the exemplary embodiment of the present invention.
Figure 8:
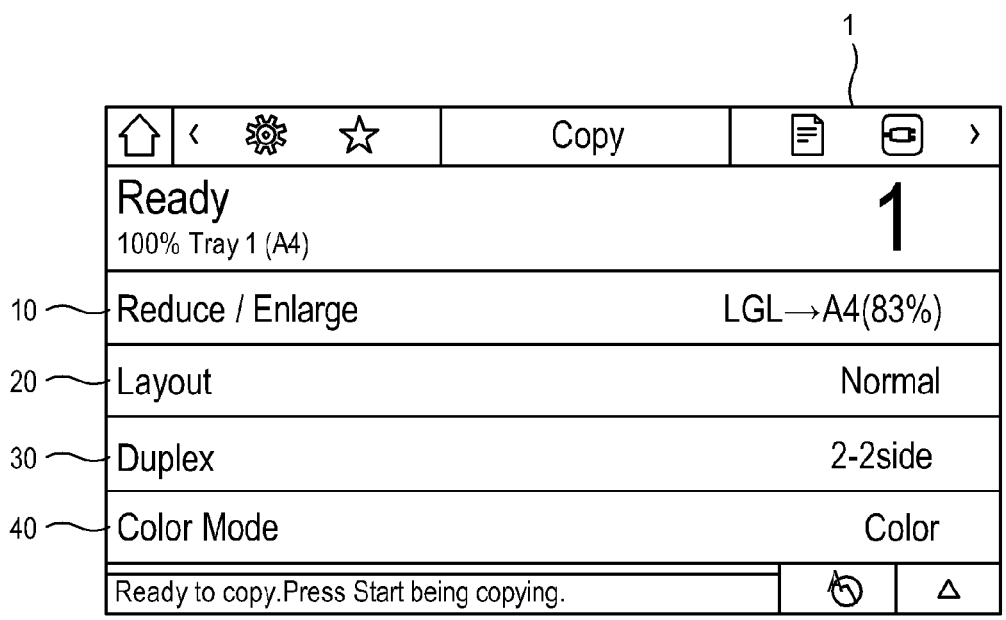

FIGS. 7 and 8 illustrate an example of a menu area of the touch screen 1 which returns to the initial menu screen according to the exemplary embodiment of the present invention.

If a user's manipulation is not detected for a predetermined time after the completion of setting the option by a user for the menu 10 in FIG. 6, the display unit 120 rotates in a predetermined direction the menu area whose option has been set and has the touch screen 1 return to the initial menu screen as in FIG. 8. The reference time for the touch screen 1 returning to the initial menu screen in case of a failure to receive a user's manipulation may be preset and stored in the storage unit 140.

The method of converting the screen area in FIG. 7 is the same as the method of converting the menu area by the rotation in FIGS. 4A to 4C.

The touch screen 1 in FIG. 8 is the same as the touch screen 1 in FIG. 3 except the set option updated to the predetermined menu 10.

Accordingly, the touch screen 1 according to an aspect of the present invention may selectively convert the menu area selected by a user without changing the remaining menus 20, and 40 and set an option for the selected menu 10. The option is set without changing the overall screen 1 and a user may easily confirm the setting result as the converted menu 10 automatically returns to the initial menu screen.

The image forming unit 130 forms an image on at least one print medium (paper) based on print data upon reception of a print command. A print operation includes a print operation for received fax data, a print operation to copy a scanned document, and a print operation for print data received from the outside through a host apparatus 201 including a server or print data stored in a storage unit (such as hard disk drive and memory) or to an external memory device (such as USB memory stick and removable hard disk).

The storage unit 140 stores therein various print data, fax data to transmit a fax, image data scanned by an image scanner (not shown), data received from the outside connected through the communication unit 150, various setting information of the image forming apparatus 100 through the user input unit 110, user certification information for each user account, and usage authorization information.

The storage unit 140 may further store therein data received from the outside through the communication unit 150 (including fax data).

The storage unit 140 includes an internal storage medium such as HDD or an external or portable storage medium such as USB memory, a memory card, memory stick, Compact Flash (CF) card, and Multimedia card (MMC) or a memory card slot.

The communication unit 150 performs a data communication with an external device including the host apparatus and a server, and receives print data in a predetermined print language from the outside.

The communication unit 150 may include a wired and/or wireless communication module connected to the external device such as a host device by a local connection or in a network by a predetermined protocol, or an interface (e.g. USB port) connected to a portable storage medium such as a USB memory.

The communication unit 150 may include a fax communication module (e.g., modem) which converts image data generated by the image scanner into a fax signal and transmits the fax signal to an external fax machine (including a multi-function device having a fax function) by using a public switched telephone network (PSTN) or receives a fax signal from the outside.

The communication unit 150 may perform a scan to host function or a scan to server function to transmit a scanned image to the host apparatus 201 or an external apparatus such as a server 202 by a predetermined protocol or perform a scan to email function to transmit a scanned image to the outside or perform a scan to USB function to transmit a scanned image to the USB memory.

The controller 160 controls the image forming apparatus 100. More specifically, the controller 160 controls the display unit 120 to display thereon the touch screen 1 including at least one menu list to perform a predetermined function of the image forming apparatus 100 as in FIG. 2, detects a user's selection by touch with respect to the menu 10 among the menus 10, 20, 30 and 40 displayed as in FIG. 3.

The controller 160 detects a user's touch with respect to the menu 10 (e.g., reduce/enlarge) as in FIG. 3, and controls the display unit 120 to convert through the screen transition process and display the menu 10 including the subordinate menu of a selected menu to set an option.

The controller 160 may control the display unit 120 to convert the menu 10 through a rotation in a predetermined direction as in FIGS. 4A to 4C as the screen transition process and display a subordinate menu of the selected menu to set the option.

The controller 160 may separately display the selected menu 10 from the remaining menus 20, 30 and 30 depending on an application of the screen transition process.

More specifically, the controller 160 may control the display unit 120 to display the menu 10 applied with the screen transition process in different font, color or size or display the menu 10 by adding a predetermined mark (e.g., star, square, arrow or other identifiable mark) or icon to be separated from the remaining menus (unselected menus) 20, 30 and 40.

The controller 160 controls the display unit 120 to display thereon the menu 10 selected by a user's touch among the list of the menus 10, 20, 30 and 40 displayed in the touch screen 1 as in FIG. 5 by the rotation in FIGS. 4A to 4C and including the subordinate menu to set the option.

The controller 160 detects a user's touch with respect to the navigation buttons 11 and 12 of the spinner control as in FIGS. 5 and 6, and controls the display unit 120 to sequentially display the available option in the option area 13.

For example, if a user selects the reduce/enlarge menu 10 by touch as in FIG. 3, the option area 13 may sequentially display 100% Original, Auto Fit, LGL−>, LTR 78%, LGL−>A4 83% according to the manipulation of the navigation buttons 11 and 12.

A user may manipulate any one of the navigation buttons 11 and 12, and set an option by sequentially changing the option displayed in the option area 13 for the menu 10.

If the setting of the option is completed, the controller 160 may control the display unit 120 to display the subordinate menu in at least one of different color and size. However, it is not limited thereto.

If a user's manipulation is not detect for a predetermined time after setting the option (e.g., LGL reduced to A4 83%) for the menu 10 as in FIG. 6, the controller 160 controls the display unit 120 to rotate the menu area whose option has been set in a predetermined direction as in FIG. 7 and return to the initial screen as in FIG. 8.

The set option is included in the menu area and displayed in the returned initial menu screen. The set option and menu area displayed in the initial screen may be enlarged or reduced corresponding to the size of the initial menu screen.

Thus, a user may confirm through the touch screen 1 in FIG. 8 that the option for the reduce/enlarge menu 10 is changed to LGL−>A4 83% from 100% Original. The conversion and returning of the touch screen 1 in FIGS. 2 to 8 may be independently performed with respect to at lest one of the menus 10, 20, 30 and 40.

FIGS. 9 to 13 illustrate a conversion and returning of the touch screen with respect to the two menus 10 and 40.

Figure 9:
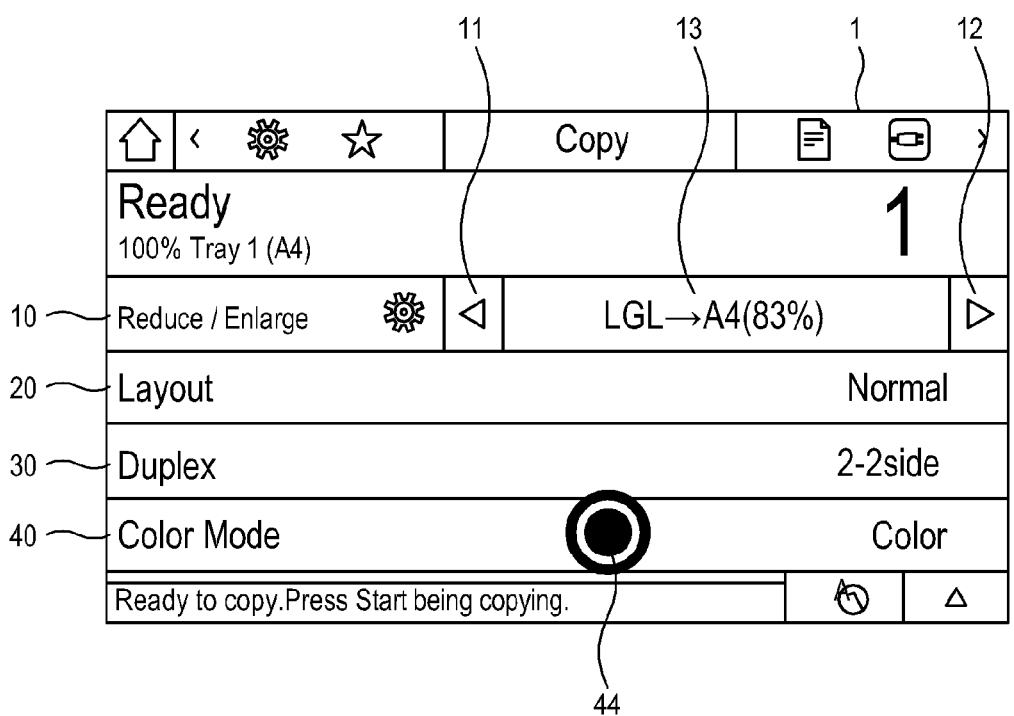
FIGS. 9 to 13 illustrate conversion and returning of the touch screen with respect to two menu areas.

As shown in FIG. 9, a user may set an option through a first subordinate menu with respect to the reduce/enlarge menu 10, and touch another menu, e.g., an area 44 of a color mode menu 40 before the reduce/enlarge menu 10 returns to the initial screen.

Figure 10:
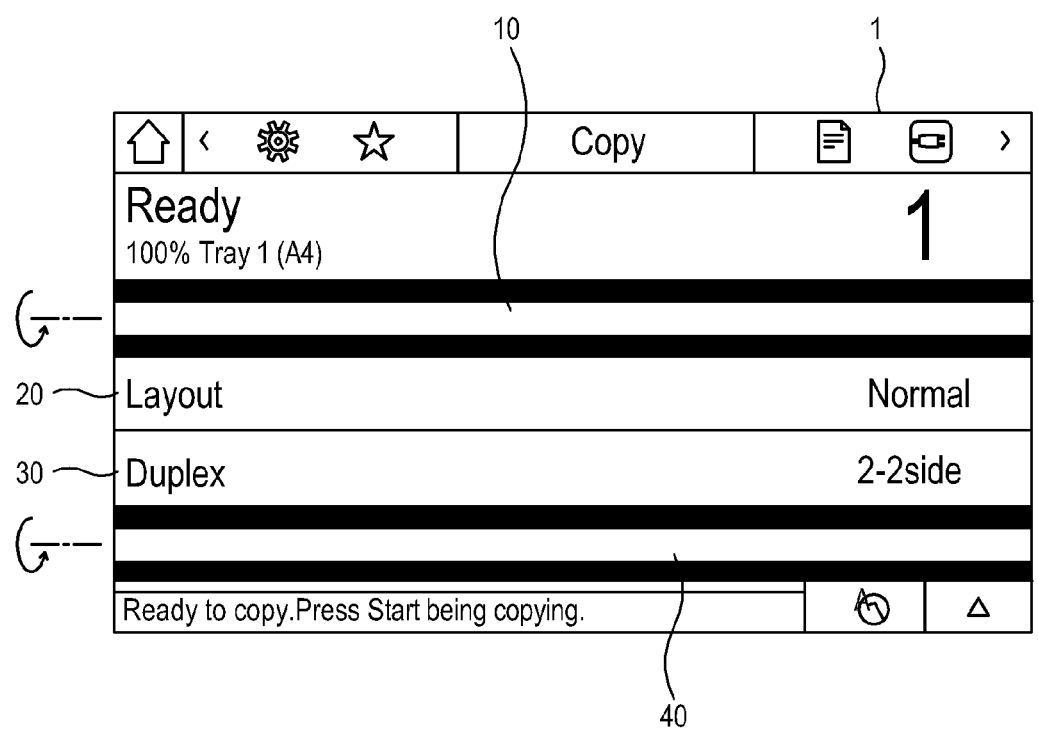
Figure 11:
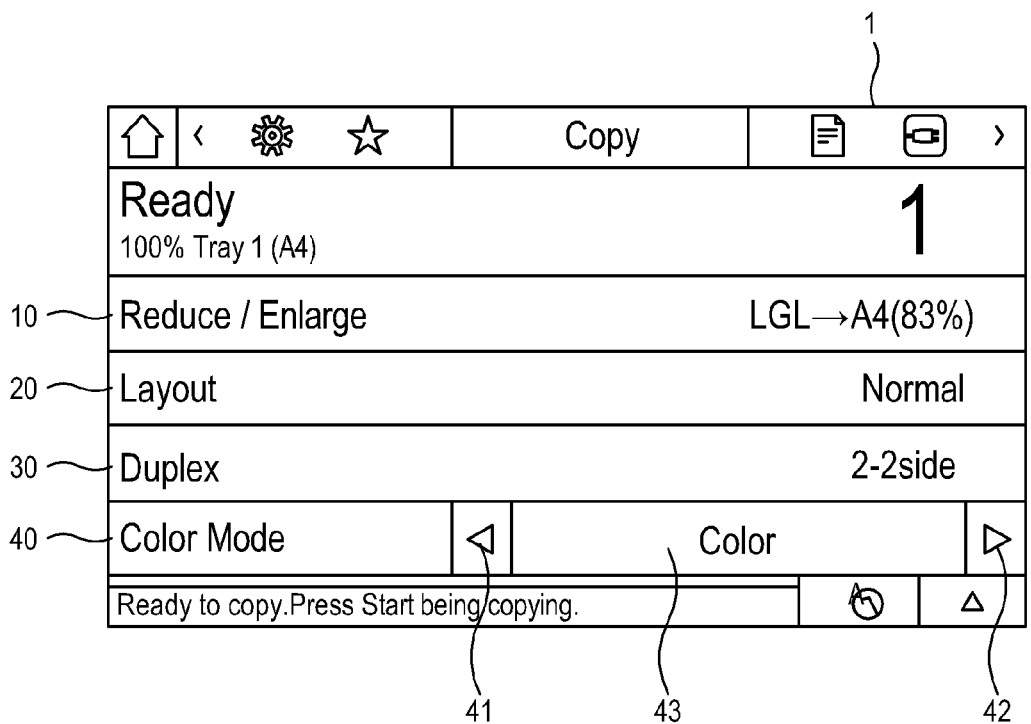

Corresponding to the selection of the color mode menu 40, the controller 160 rotates (changes) the color mode menu 40 in a predetermined direction as in FIG. 10 and controls the display unit 120 to display a second subordinate menu (e.g., color or mono) to set an option for the color mode menu 40 as in FIG. 11.

Separately from the rotation (change) of the color mode menu 40, the controller 160 controls the display unit 120 to rotate (change) the reduce/enlarge menu 10 as in FIG. 10 and has the touch screen 1 return to the initial screen as in FIG. 11 if there is no user's manipulation for a predetermined time for the reduce/enlarge menu 10.

Figure 12:
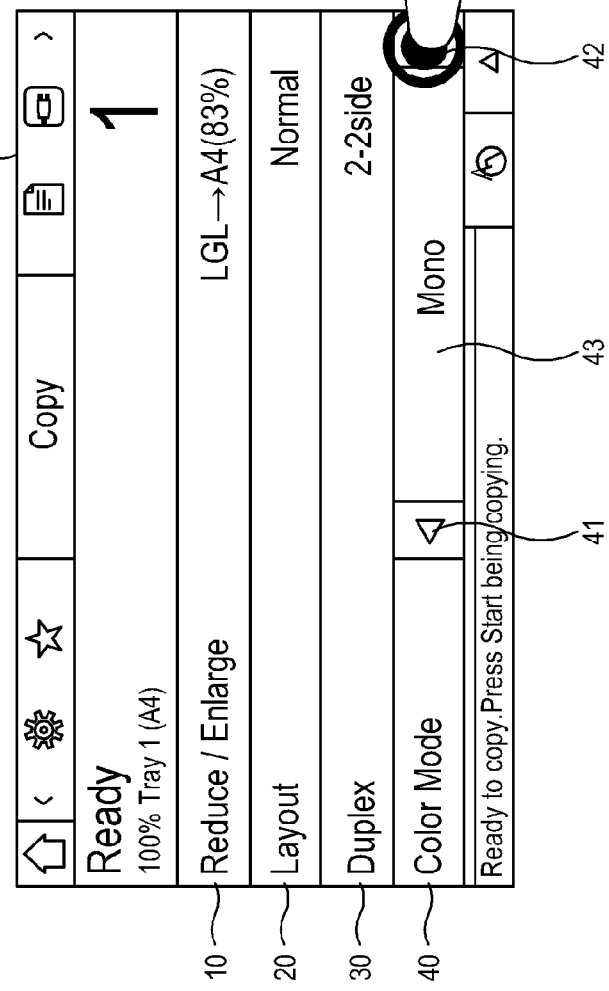

A user may manipulate the navigation buttons 41 and 42 of the spinner control, and set the color mode (e.g., mono) as the second subordinate menu of the color mode menu 40 as in FIG. 12 by confirming (touch) the option area 43 in FIG. 11.

Figure 13:
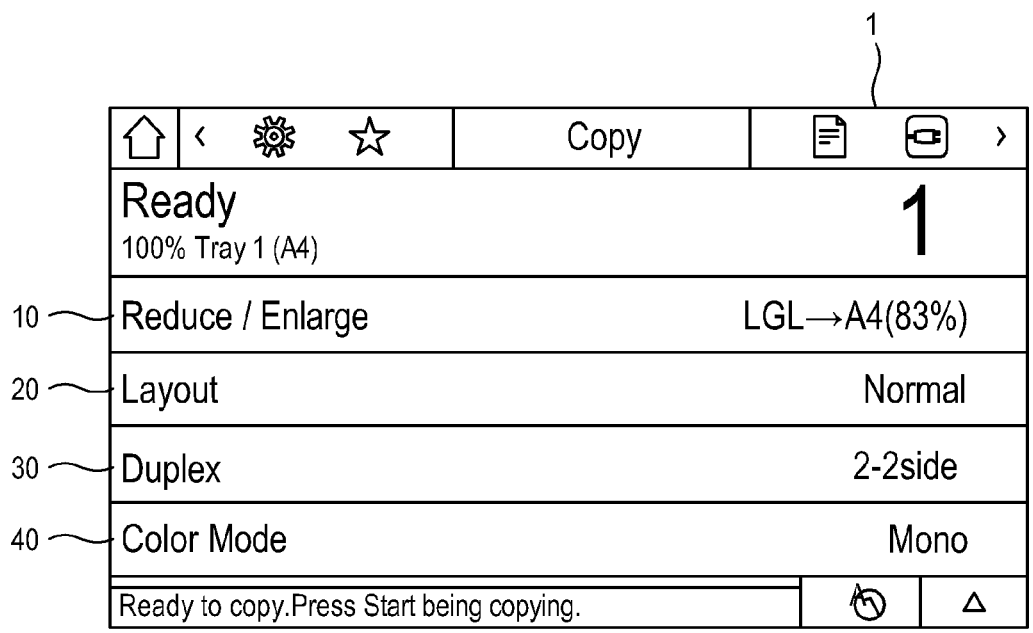

If a predetermined time elapses without a user's manipulation while the color mode is set as in FIG. 12, the controller 160 controls the display unit 120 to convert the color mode menu 40 by rotation and return to the initial screen as in FIG. 13.

A user may confirm the set option for the reduce/enlarge menu 10 and the color mode menu 40.

FIGS. 9 to 13 illustrate a conversion and returning of the two menus 10 and 40 using the touch screen 1, but the number of converted or returning menus according to the present invention is not limited thereto. Alternatively, all of the menus displayed on the touch screen 1 may simultaneously converted or return to the initial menu screen.

For example, if the color mode menu 40 is selected while the first subordinate menu is displayed to set an option for the reduce/enlarge menu 10, the controller 160 may control the display unit 120 to have the first subordinate menu return to the initial screen if a user's touch is not detected any more for the reduce/enlarge menu 10, or control the display unit 120 to simultaneously display the second and first subordinate menus for the menus 40 and 10 to set the option for the selected color mode menu 40 if a user's touch is detected continuously for the reduce/enlarge menu 10.

Thus, the image forming apparatus 100 according to an aspect of the present invention detects a user's touch with respect to at least one of the menus 10, 20, 30 and 40 and independently convert the menu screen and set the option for each menu. A user may touch only the menus 10, 20, 30 and 40 and desired options for the menus.

FIGS. 14 to 17 illustrate a touch screen 1 which displays a subordinate menu according to another exemplary embodiment of the present invention.

Figure 14:
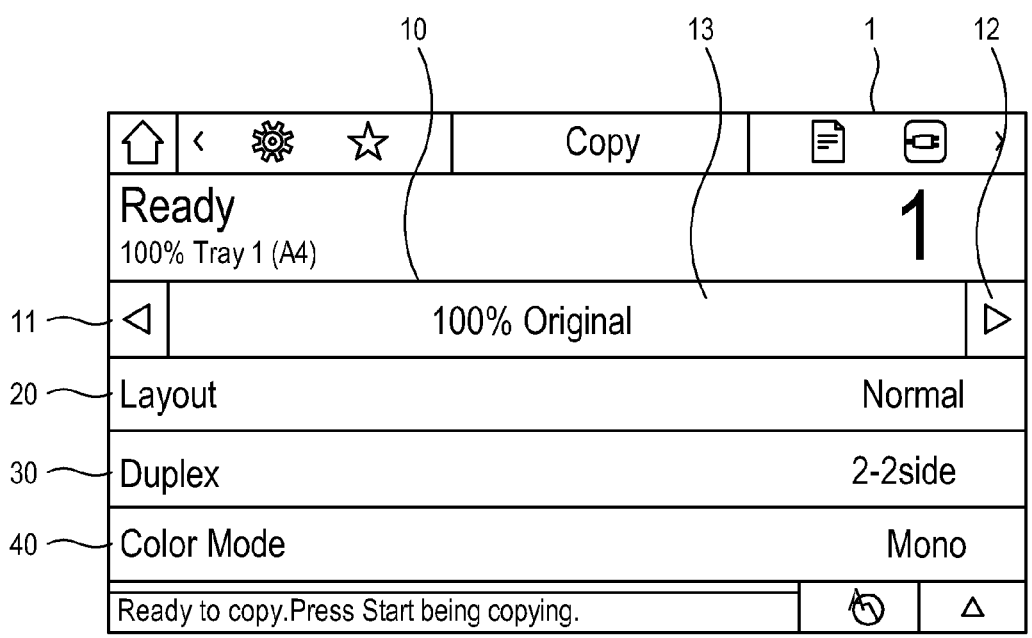
FIGS. 14 to 17 illustrate a touch screen which displays thereon a subordinate menu according to another exemplary embodiment of the present invention.
Figure 15:
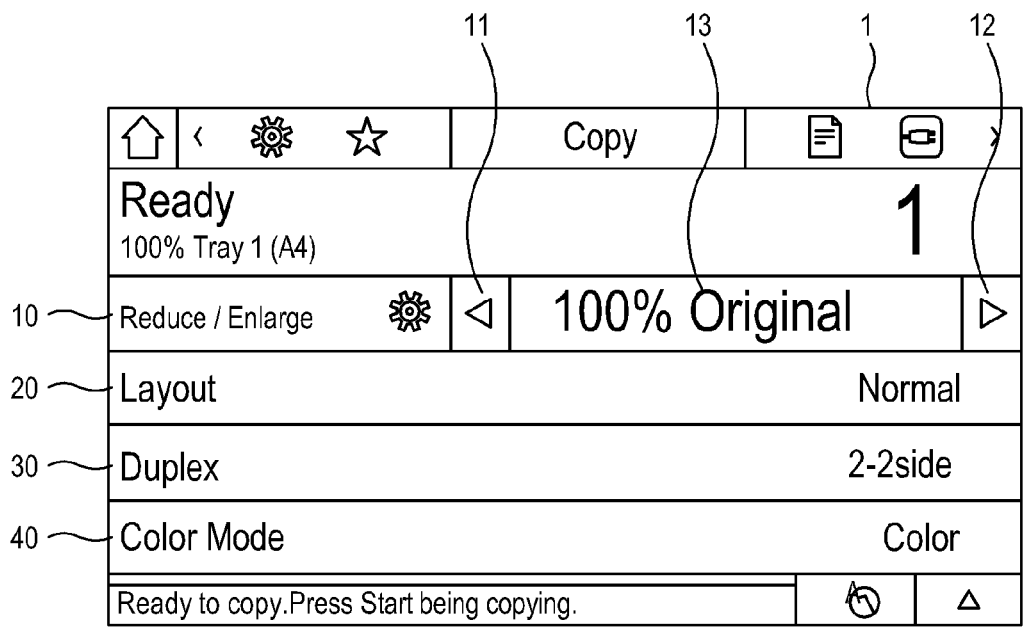

As shown in FIG. 14, the controller 160 may control the display unit 120 to display thereon the converted menu area by rotation of the menu 10 selected by a user's touch through the navigation buttons 11 and 12 and the spinner control including the option area 13.

The image forming apparatus 100 may enlarge and display the option area 13 of the spinner control through a zooming function or may change a text of the option area 13 or the color of the background.

At least one of the menus 10, 20, 30 and 40 of the touch screen 1 according to an aspect of the present invention may convert a corresponding area by not only rotation or but also other methods.

Figure 16:
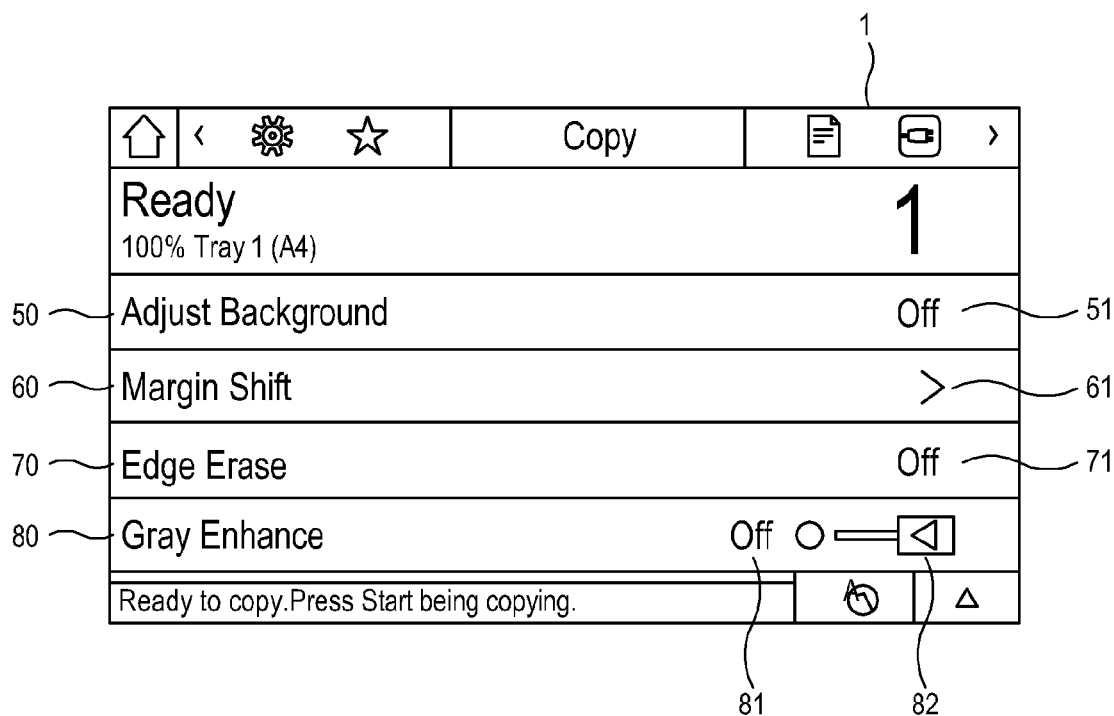

For example, at least one of the menus 10, 20, 30 and 40 of the touch screen 1 shown in FIG. 16 may include on/off buttons 51, 71 and 81 (may be toggled by touch) or level controls 61 and 82.

More specifically, if a user touches predetermined menus 50 and 60 as in FIG. 16, the controller 160 may control the display unit 120 to display the on or off buttons 51 and 71 of the option corresponding to the menus 50 and 60.

A user may manipulate the level controls 61 and 82 for the predetermined menus 60 and 70 by touch and set an option without converting the screen for the menus 60 and 70.

The predetermined menu 80 may include any one of the on/off button 81 and the level control 82 or combination thereto.

Figure 17:
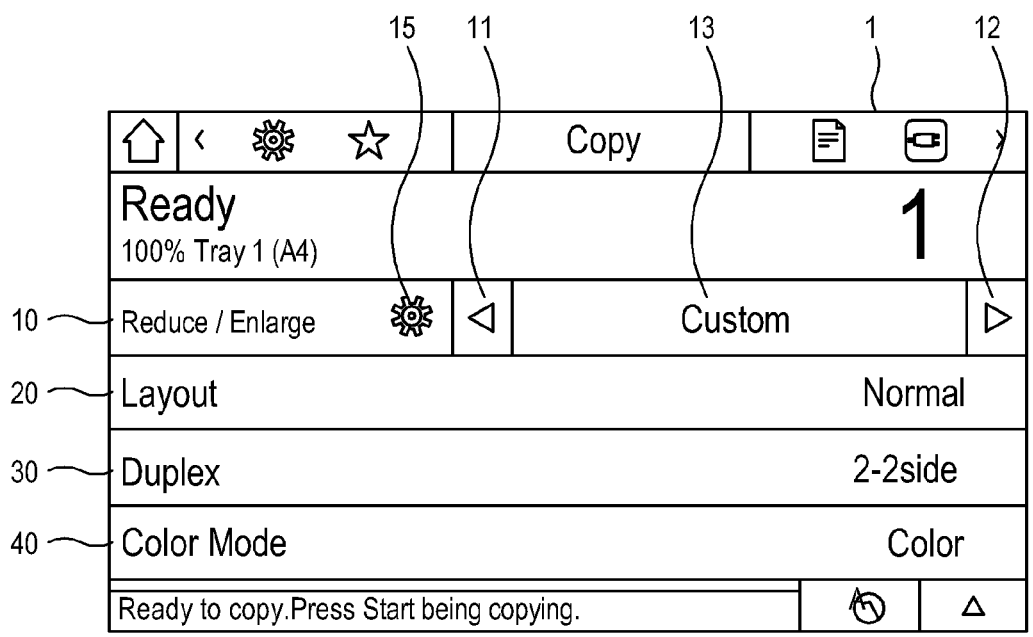

A user may select custom which converts the overall touch screen 1 into a custom screen to set an option for the menu 10 as an option for the menu 10 converted by rotation as in FIG. 17.

If a user manipulates the navigation buttons 11 and 12 and displays the custom for the option area 13, the controller 160 controls the display unit 120 to enable an icon 15 in a part of the menu 10 to enter the custom setting.

If a user selects the custom icon 15, the controller 160 may control the display unit 120 to convert the overall touch screen 1 into a screen for setting the option for the menu 10.

As above, the image forming apparatus 100 according to an aspect of the present invention may selectively convert and display the menu area with respect to the list of the menus 10, 20, 30, 40, 50, 60, 70 and 80 or may convert and display the menu by conversion of text such as on/off.

Further, the image forming apparatus 100 according to the present invention may set an option without conversion of the screen of unselected menus or set the option by converting the overall touch screen 1.

Thus, a user may use an optimized option setting method for each menu.

The present invention may apply to various electronic devices, e.g., mobile phone, PDA, MP3 player, digital camera, digital camcorder, note PC, monitor or TV employing the touch screen as well as the image forming apparatus 100.

Hereinafter, a menu select and display process of the image forming apparatus 100 having the foregoing configuration will be described with reference to FIG. 18.

Figure 18:
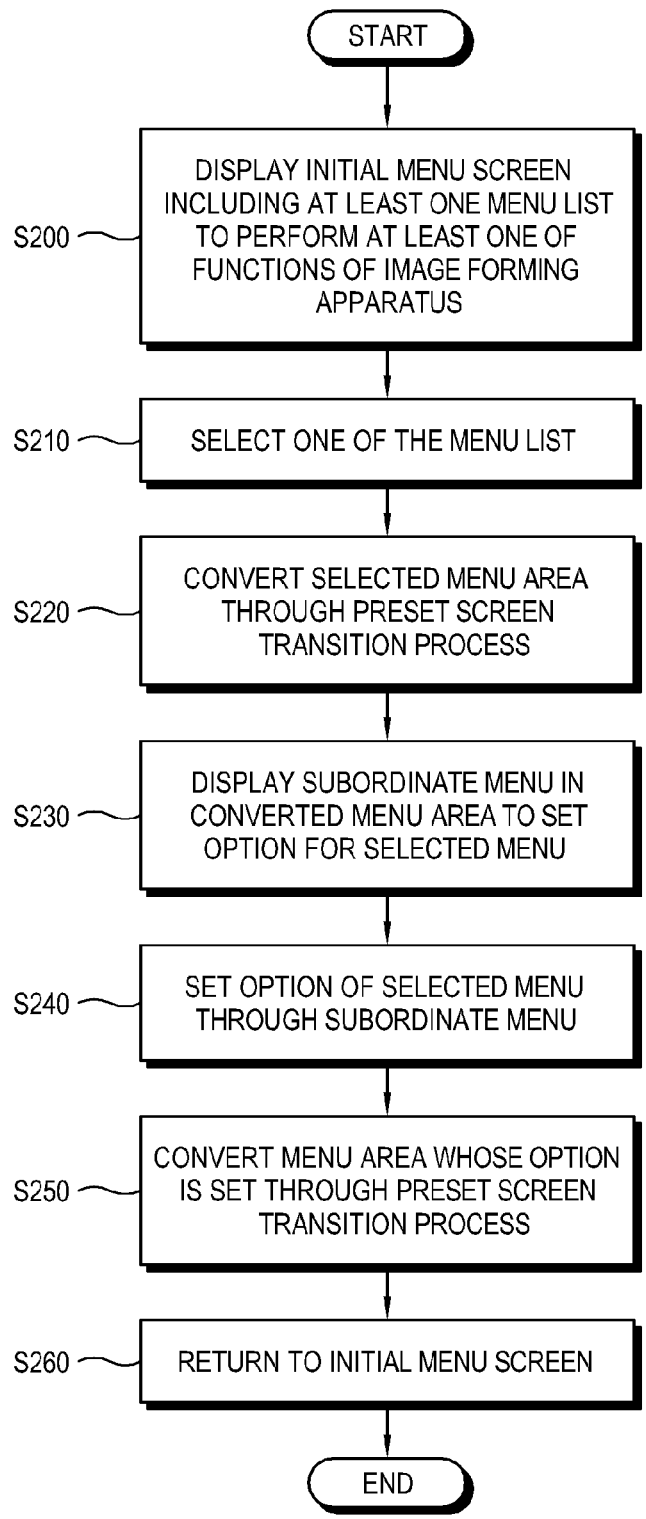
FIG. 18 is a flowchart of a menu select and display method of the image forming apparatus according to the exemplary embodiment of the present invention.

FIG. 18 is a flowchart of a conversion and display process of the screen of the image forming apparatus 100 according to the present invention.

As shown therein, the display unit 120 may display on the touch screen 1 the initial menu screen including at least one of the menus 10, 20, 30 and 40 to perform at least one of functions of the image forming apparatus 100 (S200).

A user may select the menu 10 among the menus 10, 20, 30 and 40 displayed at operation S200 (S210).

The controller 160 may control the display unit 120 to convert the menu 10 selected at operation S210 through the preset screen transition process (S220). The screen transition process is not limited to the rotation as in FIGS. 4A to 4C, and may include various transition or animation effects, or a combination thereof.

The display unit 120 displays in the menu area converted at operation S220 the subordinate menu to set the option for the selected menu 10 (S230).

A user sets the option for the selected menu 10 by using the subordinate menu displayed at operation S230 (S240).

If the option setting is completed and a predetermined time elapses, the controller 160 controls the display unit 120 to convert the menu 10 whose option has been set through the preset screen transition process like the rotation in FIG. 7 (S250).

The display unit 120 displays the initial screen as at operation S220 as a result of the conversion at operation S250 (S260). The returned touch screen 1 includes the option information set at operation S240 with respect to the menu 10 selected at operation S210 as in FIG. 9.

The conversion of the screen, option setting and returning of the screen at operations S210 to S260 may independently, i.e., simultaneously or separately be performed for each menu displayed at operation S200.

As described above, the image forming apparatus 100 and the menu select and display method thereof according to the present invention only converts the menu (area) selected by a user and sets the option for the menu, reduces unnecessary screen conversion to thereby reduce load and set and confirm the option easily.

As described above, an image forming apparatus and a menu select and display method thereof according to the present invention selectively converts a selected menu (area) only and displays a subordinate menu to set an option for the menu to thereby reduce a load arising from the conversion and returning of the overall screen and reduces user's inconvenience.

Further, the image forming apparatus and the menu select and display method thereof according to the present invention minimizes unnecessary conversion of a screen and a converted area of the screen to thereby reduce a user's burden on the manipulation of the image forming apparatus and enables a user to focus on his/her work and maintain work efficiency.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A select and display method of a menu which is displayed on a (touch) screen of an image forming apparatus, the method comprising:
    displaying an initial menu screen comprising at least one menu list permitting a user to interact with the initial menu screen to perform at least one of functions of the image forming apparatus;
    selecting one of the displayed menu lists by the user; and
    displaying a first subordinate menu (submenu) in the selected menu area permitting the user to interact with the first subordinate menu to set an option for the selected menu for performance of a function without converting (changing) the remaining menus (unselected menus),
    wherein the displaying the first subordinate menu comprises displaying the first subordinate menu in the selected menu area through a preset screen transition process to give transition or animation effects.

2. The method according to claim 1, wherein the displaying the first subordinate menu comprises separately displaying the menu area depending on an application of a screen transition process.

3. The method according to claim 1, further comprising:
    displaying a second subordinate menu if the another menu is selected while the first subordinate menu is displayed for the selected menu without returning to the initial menu screen.

4. The method according to claim 1, wherein the subordinate menu to set an option comprises at least one of a spinner control, an on/off button and a level control for the selected menu.

5. The method according to claim 1, further comprising setting an option for the selected menu through the subordinate menu.

6. The method according to claim 1, further comprising returning to the initial menu screen if the option setting is completed.

7. The method according to claim 6, wherein the returning to the initial menu screen comprises returning to the initial menu screen displaying the set option in the menu area.

8. The method according to claim 7, wherein the option and the menu area displayed on the initial menu screen is reduced or enlarged corresponding to a size of the initial menu screen.

9. The method according to claim 5, further comprising displaying at least one of a color and size of the subordinate menu to set an option of the selected menu if the option setting is completed.

10. An image forming apparatus, comprising:
a display unit which displays thereon an initial menu screen comprising at least one menu list permitting a user to interact with the initial menu screen to perform at least one of functions of the image forming apparatus;
a user input unit which comprises a screen displayed on the display unit; and
a controller which controls the display unit to display thereon a first subordinate menu (submenu) list permitting a user to interact with the first subordinate menu in the menu area to set an option for performance of a function without converting remaining menus if one of the displayed menus is selected by a user,
wherein the displaying the first subordinate menu comprises displaying the first subordinate menu in the selected menu area through a preset screen transition process to give transition or animation effects.

11. The image forming apparatus according to claim 10, wherein the display unit displays thereon the menu area separately depending on an application of a screen transition process.

12. The image forming apparatus according to claim 10, wherein the display unit displays the selected menu which returns to the initial menu screen or displays a second subordinate menu and the first subordinate menu in the menu areas if another menu is selected through the user input unit while the first menu is displayed in the selected menu area.

13. The image forming apparatus according to claim 10, wherein the subordinate menu to set an option for the menu comprises at least one of a spinner control, an on/off button and a level control for the selected menu.

14. The image forming apparatus according to claim 13, wherein the user input unit is used to set an option for the selected menu through the subordinate menu.

15. The image forming apparatus according to claim 14, wherein the display unit displays the selected menu area which returns to the initial screen if the option setting is completed.

16. The image forming apparatus according to claim 15, wherein the set option is comprised in the menu area and displayed on the initial menu screen.

17. The image forming apparatus according to claim 16, wherein the option and the menu area displayed on the initial screen are reduced or enlarged corresponding to the size of the initial screen.

18. The image forming apparatus according to claim 10, wherein the display unit converts and displays at least one of a color and a size of the subordinate menu to set an option for the selected menu if the option setting is completed.

19. The image forming apparatus according to claim 10, wherein the screen is a touch screen.

20. A select and display method of a menu which is displayed on a screen of a device having a display for a menu, the method comprising:
displaying an initial menu screen comprising at least one menu list permitting a user to interact with the initial menu screen to perform at least one of functions of the device;
selecting one of the displayed menu lists by the user;
displaying a first subordinate menu in a predetermined area permitting a user to interact with the first subordinate menu to set an option for performance of a function for the selected menu without converting (changing) the remaining menus (unselected menus);
selecting a second menu from the remaining menus; and
displaying a second subordinate menu of selected second menu,
wherein the displaying the first subordinate menu comprises displaying the first subordinate menu in the selected menu area through a preset screen transition process to give transition or animation effects.

21. The method according to claim 1,
wherein the preset screen transition process comprises giving the transition or the animation effects with texts or graphic comprising at least one of up, down, rotate, unfold, spatter, lighten, darken and slant line effect to the selected menu in a predetermined direction.

22. The image forming apparatus according to claim 10,
wherein the preset screen transition process comprises giving the transition or the animation effects with texts or graphic comprising at least one of up, down, rotate, unfold, spatter, lighten, darken and slant line effect to the selected menu in a predetermined direction.

23. The method according to claim 20,
wherein displaying the second subordinate menu comprises displaying the second subordinate menu in the predetermined area through the preset screen transition process, and
wherein the preset screen transition process comprises giving the transition or the animation effects with texts or graphic comprising at least one of up, down, rotate, unfold, spatter, lighten, darken and slant line effect to the selected menu in a predetermined direction.

* * * * *